United States Patent Office 3,424,766
Patented Jan. 28, 1969

3,424,766
EPOXIDIZED URETHANE OILS
John Edward Masters, Louisville, Ky., assignor to Celanese Coatings Company, New York, N.Y., a corporation of Delaware
No Drawing. Filed Aug. 3, 1966, Ser. No. 569,819
U.S. Cl. 260—348
Int. Cl. C07d 1/02
10 Claims This invention relates to epoxidized urethane oils. Specifically, this invention pertains to epoxidized fatty acid triglycerides which are modified by alcoholysis with aliphatic polyols and are subsequently reacted through the resulting hydroxyl groups with diisocyanates.

Natural oils, which are referred to as vegetable and marine oils and are fatty acid triglycerides, have been used for a great number of years in coatings and paints. The coating properties of the oils are improved by alcoholysis of the oils with a polyol followed by esterification with phthalic anhydride to form alkyd resins. Further improvements are obtained by replacing the phthalic anhydride with diisocyanates to form urethane oils. Urethane oils are fast drying and hard-wearing. Their wear resistance is much better than unmodified drying oils or conventional alkyd resins. These oils and modified oil compositions dry or cross-link by oxidation and polymerization through the unsaturation in the fatty acid component.

Epoxidized natural oils, which are obtained by epoxidation of the unsaturation in the natural oils, are also utilized in coatings and paints. Epoxidized oils cure to cross-linked films by reactions of catalysts and cross-linking agents with the epoxide groups in the oils.

The compositions of this invention are epoxidized urethane oils. By this invention, the excellent coating properties of urethane modified oils are combined with the excellent curing properties of epoxidized oils to produce coatings which are harder, more wear-resistant and more resistant to solvents and chemicals.

The epoxidized urethane oil compositions of this invention are prepared by first alcoholizing an epoxidized triglyceride oil with an aliphatic polyol to form an epoxidized ester containing unreacted hydroxyl groups. The resulting ester is then reacted with a diisocyanate to form urethane linkages by the isocyanate-hydroxyl reaction. The resulting composition contains a plurality of unreacted epoxide groups but no unreacted isocyanate groups.

The epoxidized oils used in this invention are obtained by the epoxidation of a drying or semi-drying oil with a peroxide or peracid. Suitable drying and semi-drying oils are triglycerides of unsaturated fatty acids wherein the fatty acid contains about 12 to 20 carbon atoms. Examples of these oils include soybean oil, linseed oil, safflower oil, cottonseed oil, lard oil, menhaden oil, tallow oil and the like, as well as mixtures of these oils. The epoxidized oils have from about 3% to about 10% epoxide or oxirane oxygen. Particularly useful epoxidized oils are those made from soybean oil and linseed oil which contain about 7% and 9% epoxide oxygen respectively. The amount of epoxide groups per molecule is an average of about 4 epoxides in each molecule of soybean oil and about 5 epoxides in each molecule of linseed oil.

Aliphatic polyols which are used to alcoholize the epoxidized oils contain 2 to about 6 hydroxyl groups per molecule and no other groups which are reactive with epoxide groups or ester groups. Examples of suitable polyols are ethylene glycol, propylene gylcol, hexylene glycol and polyalkylene glycols, i.e., polyhydroxypolyethers derived from ethylene oxide, propylene oxide, butylene oxide and the like. Other suitable polyols are glycerol, trimethylol ethane, trimethylol propane, erythritol, pentaerythritol, dipentaerythritol, as well as polyhydroxy polyethers derived from the reaction of alkylene oxides (particularly ethylene and propylene oxide) with the polyols. Particularly useful polyols are those which contain 3 to 4 aliphatic hydroxyl groups per molecule.

The diisocyanates useful in this invention are any organic aliphatic or aromatic diisocyanate which contains 2 isocyanate groups and no other groups reactive with hydroxyl groups or epoxide groups. Examples of such diisocyanates are tolylene diisocyanate, hexamethylene diisocyanate, tetramethylene diisocyanate, dianisidinediisocyanate, diisocyanatodiphenylmethane and the like.

The alcoholysis of the epoxidized oils with the polyols involves transfer of fatty acid molecules from the glycerol of the triglyceride to the hydroxyl groups of added polyol. The resulting esters are mixtures of mono- and diglycerides with partial esters of the polyol. The hydroxyl content of the mixture will depend upon the amount of polyol added and will be equivalent to the hydroxyls of the added polyol. The number of hydroxyls of the added polyol which are reacted are equivalent to the number of hydroxyls which are formed on the starting triglyceride.

The epoxide groups of epoxidized oils are relatively stable to bases and alcoholysis can be conducted under basic conditions with little reaction of the epoxide groups. The alcoholysis reaction can be carried out at temperatures as low as 75° C. using a strong base, such as sodium methoxide, and using pyridine as a solvent. Such a process is described in British Patent 908,500. Another method that can be used to alcoholyze epoxidized oils is described in U.S. Patent 3,070,608 wherein the reaction is conducted at temperatures below 125° C. using a large amount of a strong base, such as sodium methoxide, as a catalyst. Hydroxy containing epoxidized polyesters produced by these methods have a high epoxide content, since very little if any of the epoxide groups react under the low temperature conditions. However, for the purposes of this invention, the products obtained by these methods require extensive purification in order to remove the basic solvent and/or catalyst. Such bases interfere in the subsequent reaction with diisocyanates.

Alcoholysis reactions, which do not require extensive purification after reaction, are carried out at high temperatures, in excess of 200° C., using catalytic amounts (0.05 to 1 weight percent, based on the weight of the reactants) of basic metal catalysts. Temperatures as high as 250° C. have been used with less than about 10% loss of epoxide groups. The basic metal catalysts that can be used in this reaction are sodium, lithium and potassium thenate, calcium octoate, lead oxide, calcium hydroxide, alkoxides, such as the methoxides, ethoxides and isopropoxides, sodium, lithium and potassium hydrides, tetraisopropyl titanate, lead naphthenate, calcium naphcalcium carbonate and the like.

The alcoholysis of the epoxidized triglyceride oil with a polyol can be carried out at temperatures ranging from about 75° C. to about 250° C. using a basic metal catalyst. The temperature used will depend upon the type catalyst and the amount of catalyst, the lower temperatures being used with higher amounts of catalysts.

The amount of polyol which is reacted with the epoxidized oil can be varied quite widely. The exact amount will depend upon the properties desired in the ultimate product. The amount of polyol can best be expressed in terms of hydroxyl groups and the quantity used can vary from about 1 hydroxyl group per mol of epoxidized oil to about 6 hydroxyl groups per mol. The preferred amount is about 3 to about 4 hydroxyl groups per mol of epoxidized oil.

The coupling reaction between the hydroxyl containing epoxidized ester and the diisocyanate is conducted at temperatures of about 20° C. to about 150° C. and preferably at 50° C. to 100° C. for a time sufficient for all the isocyanate groups to react. This time will vary from about 30 minutes to about 6 hours depending upon the temperature at which the reaction is conducted and whether or not a catalyst is used. The use of a catalyst is not essential to the practice of the invention. However, a catalyst does accelerate the rate of reaction and thereby decreases processing times. Suitable catalysts are metal alkyl carboxylates, metal carboxylates, tertiary amines and quaternary ammonium compounds. Examples of such catalysts are dibutyl tin dilaurate, stannous octoate, stannous laurate, triethylene diamine, triethylamine, benzyldimethylamine, benzyltrimethyl ammonium chloride and the like. The amount of catalyst can be varied between about 0.01% to about 1.0% based on the weight of the reactants.

The amount of diisocyanate which is reacted with the hydroxyl containing epoxidized oil is that amount sufficient to provide between about 0.8 to about 1 isocyanate group for each hydroxyl group of the ester. Less than 0.8 equivalent can be used if a high hydroxyl content is desired in the final product. However, no more than one isocyanate equivalent should be used since the presence of unreacted isocyanate groups leads to instability in the final product.

The epoxidized urethane oils can be cured with conventional epoxide resin curing agents, such as polyamines, polyamido amines, boron fluoride type catalysts, polycarboxylic acids and polycarboxylic acid anhydrides. Particularly useful curing agents are acid terminated polyesters and acid containing copolymers of vinyl and acrylic compounds. The epoxidized urethane oils can be used as molding and encapsulating materials and are particularly useful when used in paints and as protective coatings.

The following examples are illustrative of the methods of carrying out the invention. In these examples, the extent of the alcoholysis reaction is determined by the alcohol point of the product. The alcohol point is the amount of methanol, in parts, which can be added to one part of the reaction product to form a clear solution. An alcohol point of 9 (1 part product in 9 parts methanol) or higher indicates that all the added polyol has taken part in the alcoholysis reaction.

The extent of reaction of the hydroxyl containing epoxy ester with the diisocyanate is determined by dissolving a few drops of the reaction mixture in 5–10 ml. of acetone in a test tube. A drop of saturated aqueous sodium nitrite solution is added with stirring. The development, within a few minutes, of a yellow to amber color indicates unreacted isocyanate groups. No color development indicates complete reaction.

Parts where used in the examples are parts by weight.

Example 1

To a suitable reaction flask equipped with a stirrer, thermometer and condenser were added 450 parts of epoxidized linseed oil having an epoxide equivalent weight of 184 and 105 parts of glycerine. The reaction mixture was heated to 95° C. and 11 parts of sodium methoxide were added. Heating was continued for one hour at 95–100° C. The reaction mixture was then placed in a separatory funnel to allow the excess glycerine to separate. The reaction product was then drawn off and was centrifuged to remove traces of salts. The product had an epoxide equivalent weight of 210.

To another reaction flask were added 131 parts of the reaction product described above and 189 parts of methyl isobutyl ketone. To this solution were added 43.5 parts of tolylene diisocyanate dropwise over a period of 4 hours with stirring. Ethylene glycol monoethyl ether acetate (50 parts) was added to reduce the viscosity. The product had an epoxide equivalent of 288 on solids basis and a Gardner-Holdt viscosity at 25° C. of S at 39.9% solids.

Four parts of the epoxidized urethane oil were blended with four parts of an acid terminated polyester of chlorendic anhydride and a polyol having an acid value of 165 on solids basis and a Gardner-Holdt viscosity at 25° C. of $Z-Z_1$ at 60% solids in a mixture of xylene and ethylene glycol monoethyl ether acetate. Films were drawn down on glass panels using a 3 mil doctor blade. After 2 weeks at 25° C., the films were well cured and had a pencil hardness of H.

Example 2

To a reaction flask equipped as described in Example 1 were added 360 parts of epoxidized linseed oil (epoxide equivalent weight—184). The oil was heated to 220° C. where 27.2 parts of pentaerythritol and 0.3 part of lead naphthenate were added. The temperature was then raised to 245° C. and was held at this temperature for 15 minutes. After cooling, the alcoholized product had an epoxide equivalent weight of 225 and an infinite alcohol point.

To another reaction flask were added 129 parts of the alcoholized product and 152 parts of methyl isobutyl ketone. The temperature was raised to 95° C. and at this temperature, 23 parts of tolylene diisocyanate were added to the solution over a one-hour period. The temperature was held at 95° C. for one additional hour. The resulting product had an epoxide equivalent weight of 250 on solids basis and a Gardner-Holdt viscosity at 25° C. of D at 49% solids.

2.5 parts of the resulting solution were blended with 5 parts of a 46% solids solution in methyl isobutyl ketone of a copolymer of 40 weight percent ethyl acrylate, 35 weight percent vinyl toluene and 25 weight percent acrylic acid. Three mil films were drawn down on glass panels and were baked at 125° C. for 15 minutes. The resulting well cured films had good mar resistance and adhesion to the glass.

Example 3

To a suitable reaction flask equipped as described in Example 1 were added 485 parts of epoxidized linseed oil (epoxide equivalent weight—184). The oil was heated to 200° C. and 80 parts of trimethylol propane were added. The temperature was held at 200° C. for 15 minutes. One part of calcium octoate was added and the temperature was raised to 225° C. and was held at 225° C. for 10 minutes. At this time the alcohol point was greater than 9. The resulting alcoholyzed oil had an epoxide equivalent weight of 230.

Xylene (480 parts) was added to the alcoholyzed oil and the temperature was adjusted to 90° C. After addition of dibutyl tin dilaurate (0.5 part), 135 parts of tolylene diisocyanate were added dropwise over a one-hour period while controlling the temperature between 90–96° C. After heating for an additional hour at 95° C., the reactants were cooled. The resulting epoxidized urethane oil had an epoxide equivalent weight of 296 on solids basis and a Gardner-Holdt viscosity at 25° C. of Z–4 at 60% solids.

A blend was made from 9 parts of the epoxidized urethane oil solution and 6 parts of the polyester solution described in Example 1. Films were drawn down on glass panels from the blend using a 3 mil doctor blade. After 2 weeks at 25° C., the films were well cured and had a pencil hardness of H.

Example 4

To a reaction flask equipped as descriped in Example 1 were added 485 parts of epoxidized linseed oil (epoxide equivalent weight—184). The oil was heated to 200° C., where 54 parts of trimethylol propane, 27 parts of 1,4-butanediol and 1 part of calcium octoate were added. The temperature was raised to 225° C. and was held at 225° C. for 15 minutes. The resulting alcoholyzed product had an epoxide equivalent weight of 233 and an alcohol point greater than 9.

The alcoholyzed oil was dissolved in 480 parts of xylene and the solution was heated to 90° C. Dibutyl tin dilaurate (0.5 part) was added followed by the dropwise addition of tolylene diisocyanate (135 parts) while holding the temperature at 90–96° C. After this addition (1 hour), the temperature was held at 94–96° C. for an additional hour and was then cooled. The product had an epoxide equivalent weight of 302 on solids basis and a Gardner-Holdt viscosity at 25° C. of Z to $Z_1$ at 59.4% solids.

A blend was prepared from 9 parts of the epoxidized urethane oil solution and 9 parts of the polyester solution described in Example 1. Films were prepared from the blend on glass panels using a 3 mil doctor blade. The films were well cured after 2 weeks at 25° C. and had a pencil hardness of H. The films also cured well after being heated at 125° C. for 15 minutes.

Example 5

To a reaction flask equipped as described in Example 1 were added 485 parts of epoxidized linseed oil (epoxide equivalent weight—184). The oil was heated to 200° C. where 250 parts of a polyether triol (polypropylene oxide adduct of trimethylol propane having an average molecular weight of 418) and 1 part of calcium octoate were added. The temperature was raised to 225° C. and was held at 225° C. for 1.5 hours. The temperature was then raised to 245° C. and was held at 245° C. for 30 minutes. After this heating period, the alcohol point was greater than 9, and the epoxide equivalent weight was 305.

The product was dissolved in 580 parts of xylene and the temperature was raised to 90° C. Dibutyl tin dilaurate (0.5 part) was added followed by dropwise addition of tolylene diisocyante over a one-hour period while holding the temperature at 90–96° C. The temperature was held at 94–96° C. for an additional hour. The resulting epoxidized urethane oil had an epoxide equivalent weight of 365 on solids basis and a Gardner-Holdt viscosity at 25° C. of V–W at 60% solids.

A blend was prepared from 7 parts of the epoxidized urethane oil solution and 6 parts of the polyester solution described in Example 1.3 mil films were prepared on glass panels and were baked at 125° C. for 15 minutes. The resulting films were well cured, tough and flexible.

It is to be understood that the foregoing detailed description is given merely by way of illustration and that many variations may be made therein without departing from the spirit of the invention.

The embodiments of this invention in which an exclusive property or privilege is claimed are defined as follows:

1. A process for preparing epoxidized urethane oils which comprises:
    (a) alcoholyzing an epoxidized triglyceride oil with a polyol to form an epoxidized ester containing unreacted hydroxyl groups, wherein the polyol contains 2 to 6 aliphatic hydroxyl groups and no other groups reactive with ester groups or epoxide groups and wherein the polyol and the oil are reacted in the ratio of about 1 to 6 hydroxyl groups of the polyol to 1 mol of the oil; and
    (b) coupling the hydroxyl containing epoxidized ester with a diisocyanate by reaction of the isocyanate group with the hydroxy groups in the ratio of 0.8 to 1 isocyanate group per hydroxyl group to form an epoxidized urethane oil.

2. The process of claim 1 wherein the polyol contains 3 to 4 hydroxyl groups, and wherein the polyol and the epoxidized oil are reacted in the ratio of about 3 to 4 hydroxyl groups of the polyol to 1 mol of the oil.

3. The process of claim 1 wherein the epoxidized oil is epoxidized linseed oil containing about 5 epoxide oxygens per molecule.

4. The process of claim 1 wherein the polyol is trimethylol propane and the diisocyanate is tolylene diisocyanate.

5. The process of claim 1 wherein the alcoholysis reaction is conducted at a temperature of about 75° C. to about 250° C. using a basic metal catalyst.

6. The process of claim 1 wherein the coupling reaction is conducted at a temperature of about 20° C. to about 150° C.

7. The epoxidized urethane oil obtained by the process of claim 1.

8. A process for preparing epoxidized urethane oils which comprises:
    (a) alcoholyzing an epoxidized triglyceride oil with a polyol to form an epoxidized ester containing unreacted hydroxyl groups at a temperature of about 200° C. to about 250° C. using 0.05 to 1.0 weight percent, based on the weight of the reactants, of a basic metal catalyst, wherein the polyol contains 3 to 4 hydroxyl groups per molecule and no other groups reactive with epoxide groups or ester groups and wherein the polyol and the oil are reacted in the ratio of about 3 to 4 hydroxyl groups of the polyol to 1 mol of the oil; and
    (b) coupling the hydroxyl containing epoxidized ester with a diisocyanate containing 2 isocyanate groups and no other groups reactive with hydroxyl groups or epoxide groups at a temperature of about 20° C. to about 150° C. wherein the diisocyanate and the ester are reacted in the ratio of 0.85 to 0.95 isocyanate group per hydroxyl group.

9. The process of claim 8 wherein the basic metal catalyst is lead naphthenate.

10. The process of claim 8 wherein the coupling reaction is conducted using 0.1 to 1.0 weight percent, based on the weight of reactants, of a catalyst selected from the group consisting of metal alkyl carboxylates, metal carboxylates, tertiary amines and quaternary ammonium compounds.

References Cited

UNITED STATES PATENTS 3,184,420  5/1965  Brack _____ 260—348 X
3,248,349  4/1966  Szabat et al. _____ 260—2.5

FOREIGN PATENTS 908,500  10/1962  Great Britain.

NORMA S. MILESTONE, Primary Examiner.

U.S. Cl. X.R.

260—18, 22, 23; 117—124; 106—244